US010867415B1

(12) United States Patent
Korbin et al.

(10) Patent No.: US 10,867,415 B1
(45) Date of Patent: Dec. 15, 2020

(54) DEVICE AND METHOD FOR CONSTRUCTING AND DISPLAYING HIGH QUALITY IMAGES FROM IMAGING DATA BY TRANSFORMING A DATA STRUCTURE UTILIZING MACHINE LEARNING TECHNIQUES

(71) Applicant: National Technology & Engineering Solutions of Sandia, LLC, Albuquerque, NM (US)

(72) Inventors: John P. Korbin, Albuquerque, NM (US); David Peterson, Albuquerque, NM (US); Matthew David Smith, Albuquerque, NM (US); Carianne Martinez, Albuquerque, NM (US); Charles Snider, Albuquerque, NM (US); Kevin M. Potter, Rio Rancho, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 149 days.

(21) Appl. No.: 16/250,910

(22) Filed: Jan. 17, 2019

(51) Int. Cl.
*G06T 9/00* (2006.01)
*G06T 1/60* (2006.01)
*G01N 23/04* (2018.01)
*G06N 3/04* (2006.01)

(52) U.S. Cl.
CPC .............. *G06T 9/002* (2013.01); *G01N 23/04* (2013.01); *G06N 3/0454* (2013.01); *G06T 1/60* (2013.01)

(58) Field of Classification Search
CPC ........... G06T 9/002; G06T 1/60; G01N 23/04; G06N 3/0454
See application file for complete search history.

(56) References Cited

U.S. PATENT DOCUMENTS

2018/0172606 A1* 6/2018 Monkawa ............ A61B 6/4021
2018/0315220 A1* 11/2018 Magalotti ................ G06T 1/60
2019/0108904 A1* 4/2019 Zhou .................... G06T 11/003

OTHER PUBLICATIONS

Long, J. et al., "Fully Convolutional Networks for Semantic Segmentation," In Proceedings of the IEEE Conference on Computer Vision and Pattern Recognition, 2015, pp. 3431-3440.
(Continued)

*Primary Examiner* — Brandon J Miller
(74) *Attorney, Agent, or Firm* — Yee & Associates, P.C.

(57) ABSTRACT

Constructing a computer image from raw imaging data or encoded imaging data by transforming a first data structure in which the raw imaging data or the encoded imaging data is stored into a second data structure storing reorganized imaging data. The raw imaging data or the encoded imaging data is received, stored in the first data structure. The computer reorganizes the raw imaging data or the encoded imaging data into the reorganized data and stores the reorganized data in the second data structure, which is a multidimensional array having subarrays containing local information needed by a convolutional neural network for processing the reorganized data. Other portions of the multidimensional array store other portions of the raw imaging data or the encoded imaging data. The computer also processes the reorganized data using the convolutional neural network to construct the image, whereby a constructed image is formed.

20 Claims, 7 Drawing Sheets

(56) References Cited

OTHER PUBLICATIONS

Kak et al., "Principles of Computerized Tomographic Imaging," Jan. 2001, Society for Industrial and Applied Mathematics, ISBN: 978-0-89871-494-4, 333 pages.
Wang, G.E., "A Perspective on Deep Imaging," IEEE Access, 2016, V.4, pp. 8914-8924.
Chetih, N. et al., "Tomographic Image Reconstruction Using Filtered Back Projection (FBP) and Algebraic Reconstruction Technique (ART)". IEEE 2015 3rd International Conference on Control, Engineering & Information Technology (CEIT), pp. 1-6.
Zhu, B. et al., "Image Reconstruction by Domain-transform Manifold Learning", Nature, Mar. 22, 2018, vol. 555, pp. 487-492.

\* cited by examiner

QUANTITATIVE NOISE COMPARISON BETWEEN FBP METHODS

500

256x256 1000 IMAGES

| METHOD | MEAN SAE | STD DEV |
|---|---|---|
| SHEPP-LOGAN | 213187.868 | 1591.225 |
| COSINE | 245758.049 | 1707.424 |
| RAMP | 199613.665 | 1526.624 |
| HANN | 203735.944 | 1584.215 |
| HAMMING | 203271.697 | 1581.274 |
| ML | 46733.841 | 26770.032 |

| METHOD | MEAN MSE | STD DEV |
|---|---|---|
| SHEPP-LOGAN | 27.725 | 0.146 |
| COSINE | 54.368 | 0.219 |
| RAMP | 18.817 | 0.137 |
| HANN | 21.777 | 0.139 |
| HAMMING | 21.490 | 0.139 |
| ML | 1.799 | 1.469 |

| METHOD | MEAN PSNR | STD DEV |
|---|---|---|
| SHEPP-LOGAN | 26.231 | 0.403 |
| COSINE | 23.307 | 0.406 |
| RAMP | 27.915 | 0.400 |
| HANN | 27.280 | 0.402 |
| HAMMING | 27.338 | 0.401 |
| ML | 38.849 | 2.014 |

| METHOD | MEAN NRMSE | STD DEV |
|---|---|---|
| SHEPP-LOGAN | 0.049 | 0.002 |
| COSINE | 0.068 | 0.003 |
| RAMP | 0.040 | 0.002 |
| HANN | 0.043 | 0.002 |
| HAMMING | 0.043 | 0.002 |
| ML | 0.012 | 0.003 |

DEVICE AND METHOD FOR CONSTRUCTING AND DISPLAYING HIGH QUALITY IMAGES FROM IMAGING DATA BY TRANSFORMING A DATA STRUCTURE UTILIZING MACHINE LEARNING TECHNIQUES

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND INFORMATION

1. Field

The present disclosure relates to improving a data structure in which imaging data is stored such that a computer can produce improved images from imaging data with fewer errors for display on a display device.

2. Background

Imaging tools have become useful tools in many fields, such as but not limited to security, medicine, and scientific inquiry. For example, X-ray machines are used to take images of teeth at a dentist's office or the contents of luggage at an airport security checkpoint.

SUMMARY

The illustrative embodiments provide for a method of using a computer to construct an image from raw imaging data or encoded imaging data by transforming a first data structure in which the raw imaging data or the encoded imaging data is stored into a second data structure storing reorganized imaging data. The method includes receiving, at the computer from an imaging machine, the raw imaging data or the encoded imaging data stored in the first data structure. The method also includes reorganizing, by the computer, the raw imaging data or the encoded imaging data into the reorganized data and storing the reorganized data in the second data structure. The second data structure comprises a multi-dimensional array having subarrays. The subarrays contain only local information needed by a convolutional neural network for processing the reorganized data by the convolutional neural network. Other portions of the multi-dimensional array store other portions of the raw imaging data or the encoded imaging data. The method also includes processing, by the computer, the reorganized data using the convolutional neural network to construct the image, whereby a constructed image is formed.

The illustrative embodiments also contemplate a computer including a processor and a non-transitory computer readable storage medium storing program code which, when executed by the processor, performs the computer-implemented method. The illustrative embodiments also contemplate such a non-transitory computer readable storage medium itself.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that, improved techniques for processing imaging data are desirable. Thus, the illustrative embodiments are related to how to process the data taken by an imaging machine, such as but not limited to a computed tomography scanner or a magnetic resonance imaging machine, and convert that data into an image. The illustrative embodiments recognize and take into account that current techniques are less than desirable because the resulting images are often undesirably fuzzy or lack the detail that the end user wishes to see.

An important technical effect of the illustrative embodiments is that the quality of the image is improved. The data structure conversion and data processing techniques described herein reduce errors and improve the quality of the image, thereby allowing the end user to more clearly see more detailed features on the resulting image. Thus, the illustrative embodiments have the technical effect of increasing the quality of a display of an image that results from the imaging data. Improved images, in turn, lead to improved results in applications such as medicine, security, engineering, and others.

The illustrative embodiments provide for additional technical effects. For example, the illustrative embodiments convert imaging data received in one data structure and converting it into a second data structure for additional processing in an improved manner. This technical effect is only applicable in computers, because a human would reconstruct such data more directly.

Attention is now turned to a summary of the inventive data structure conversion. The illustrative embodiments provide for a combination of a unique projection method for a non-local dataset onto a space which facilitates machine learning on the reconstruction of the imaging data into volumetric data.

In a specific, non-limiting example, the illustrative embodiments may be implemented on data taken by an X-ray computed tomography machine (X-ray CT). The X-ray CT uses a process where X-ray images are used to infer volumetric information. Current image reconstruction methods include, for example, filtered back projection (FBP), simultaneous algebraic reconstruction technique (SART), and others. However, these current image reconstruction methods have numerical limitations which produce numerous artifacts. Artifacts are defects in the image which result from the image reconstruction process, but that do not represent actual physical features in the object or objects being imaged. Artifacts reduce image quality and are therefore undesirable.

Modern attempts at reducing artifacts rely on a step of de-noising data, post-reconstruction. However, such techniques have had limited success, and still leave an undesirable number of artifacts in the resulting image.

However, the illustrative embodiments provide for a new, paradigm-shifting method that improves the data reconstruction itself, instead of trying to fix artifacts that arise during reconstruction. Thus, the illustrative embodiments are fundamentally different than prior image processing techniques.

The illustrative embodiments may be referred to generally by the following name: Rank And File Transform Network (RAFT Network). In the case of processing data from an X-ray CT device, the illustrative embodiments may be referred to as a CT Rank And File Transform Network (CRAFT Network). These names imply no structural or operational limitations on the claims or the descriptions below, but rather are used for convenient reference only.

The illustrative embodiments align relevant information from an externally defined source to take advantage of the strengths of machine learning techniques, such as convolutional neural networks. Sinograms encode the data taken during the imaging scan via a direct mapping of shadow onto a line. In the case of a CT scanner, the data is structured such that relevant data for a given point in the original space is not local. Other reconstruction methods work directly with the raw sinogram. The illustrative embodiments realign the data such that columns in a 3D array contain local information needed by a convolutional neural network. Thus, by realigning data, the illustrative embodiments transform the imaging data from its original data structure into a new data structure.

This method is not constrained to X-ray CT reconstruction and sinograms. Generally, the illustrative embodiments may be applied to any dataset which does not have simple local properties.

Figure 1:
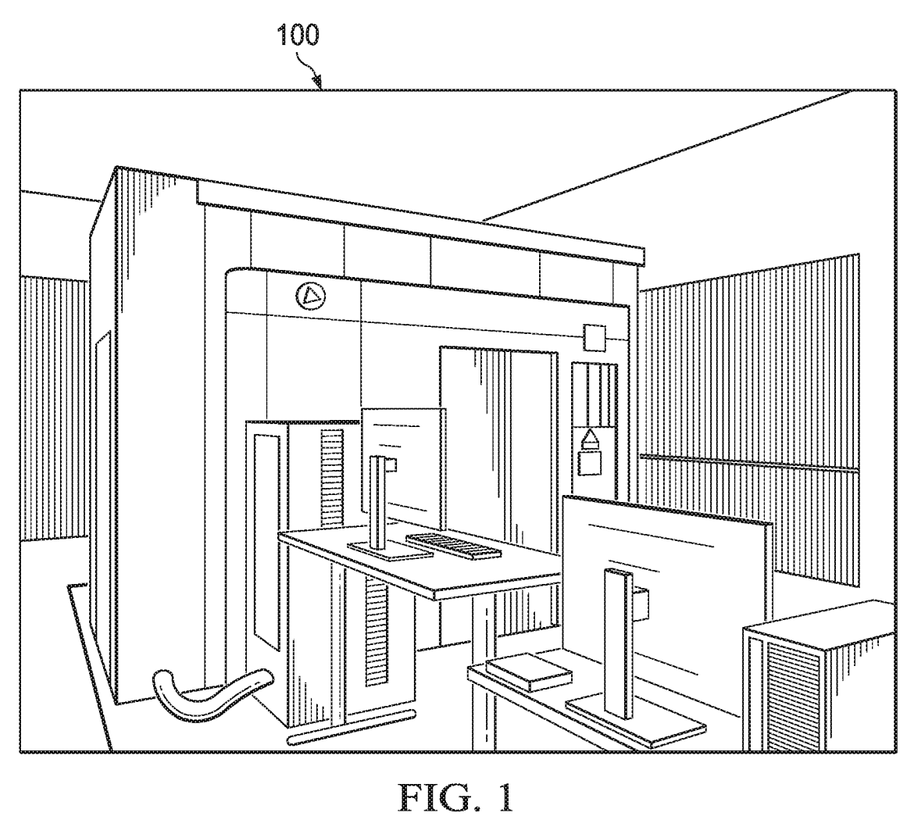
FIG. 1 illustrates an imaging machine, in accordance with an illustrative embodiment.

FIG. 1 illustrates an imaging machine, in accordance with an illustrative embodiment. Imaging machine 100 may be one of many different kinds of imaging machines. Imaging machine 100 may be a computed tomography X-ray machine, a positron emission tomography machine, an X-ray machine, an ultrasound machine, a computerized tomography scanner, a magnetic resonance imaging machine, a synthetic aperture radar machine, an acoustic tomography machine, and a cryogenic electron tomography machine. Imaging machine 100 may also be other types of imaging machines, as the illustrative embodiments are applicable to transform many different types of imaging data.

Imaging machine 100 may be a CT X-ray machine. However, many other applications are contemplated. Imaging may be applied in a wide variety of applications, including physics, engineering, medicine, astronomy, and many other. Thus, the illustrative embodiments have the potential to substantially improve the results of many different disciplines.

Figure 2:
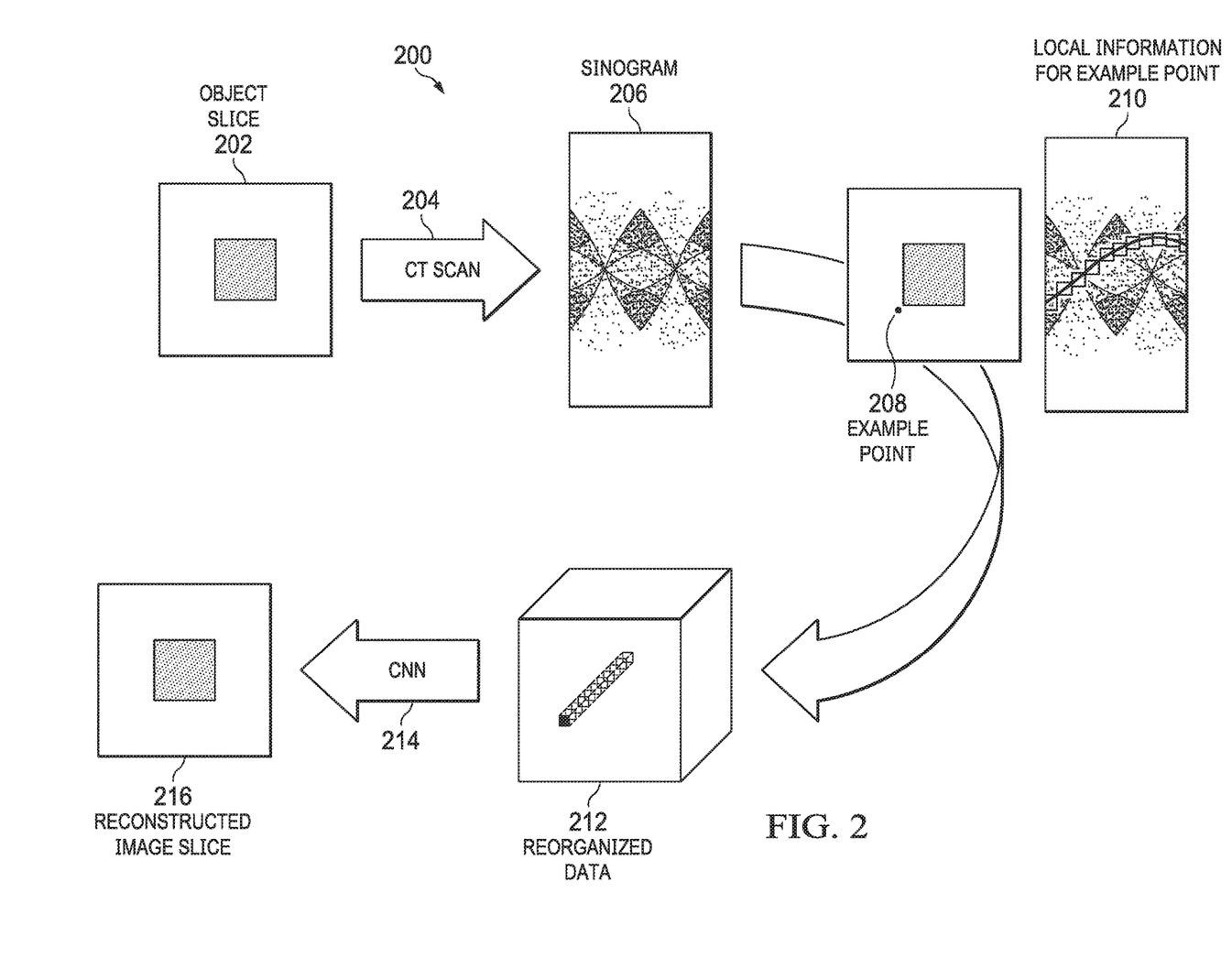
FIG. 2 illustrates a process for reorganizing imaging data into different data structures to improve the accuracy of the computing process, in accordance with an illustrative embodiment.

FIG. 2 illustrates a process for reorganizing imaging data into different data structures to improve the accuracy of the computing process, in accordance with an illustrative embodiment. Process 200 may be implemented using a computer and an imaging device, such as imaging device 100 of FIG. 1A in conjunction with data processing system 800 of FIG. 8.

Initially, object slice 202 is provided. Object is an object of interest, which for purposes of this example is oversimplified to be a box within a darker box. However, object slice 202 may be any object or person to be imaged. A CT scan is then taken of the object at operation 204. Note that many different imaging techniques could be used.

A sinogram is then created at operation 206. A sinogram is a data structure that compiles the imaging data from several projections of a scan as either the source and detector are rotated or the object is rotated. Each projection along a particular direction has information about the material between the source and the detector. When the outputs from the detectors are placed in order of projection angle, the resulting figure is called a sinogram.

Each point for the whole of a slice of the image to be reconstructed is processed, of which 208 is an example point. For the given point, the local information for example point 210 shows the points that have the information relevant to the example point 208. For all points, the path is determined by the scanner geometry and the individual point position. That data from the sinogram is transformed into a new, reorganized data structure at operation (insert new number to label the transition). The sinogram is straightened at this operation, as shown at result 212, resulting in a localization of relevant data within subarrays. Specifically, the data is reorganized into a multi-dimensional array having subarrays. The subarrays contain only local information needed by a convolutional neural network for processing the reorganized data by the convolutional neural network. Other portions of the multi-dimensional array store other portions of the raw imaging data or the encoded imaging data. The result of this new data structure is that the data is in a form which is more readily useable by a machine learning technique. The illustrative embodiments specifically contemplate using a convolutional neural network 214 (abbreviated as "CNN" in FIG. 2). However, the data structure can be modified to specifically suit other machine learning techniques.

Thereafter, the method also includes processing, by the computer, the reorganized data using the convolutional neural network 214 to construct the reconstructed image slice 216, whereby a constructed image is formed. Because the fundamental reconstruction method is different than any prior image reconstruction method, the problems of artifacts are greatly reduced or eliminated altogether. In other words, the illustrative embodiments avoid the problem of artifacts in the first place, rather than try to correct for them.

Figure 3:
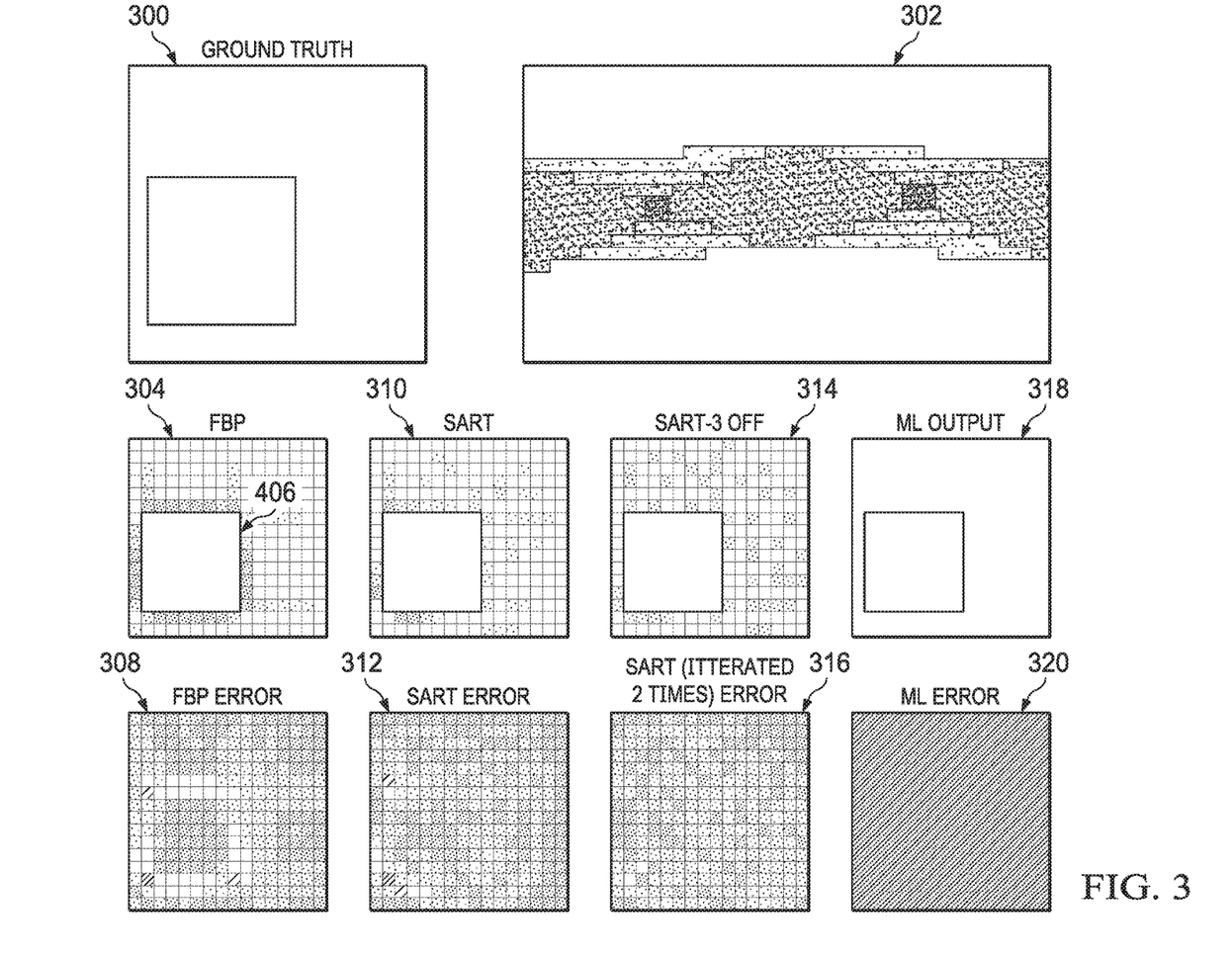
FIG. 3 illustrates an example comparing imaging data analyzed using prior techniques to imaging data analyzed using the data structure conversion described herein, in accordance with an illustrative embodiment.

FIG. 3 illustrates an example comparing imaging data analyzed using prior techniques to imaging data analyzed using the data structure conversion described herein, in accordance with an illustrative embodiment. FIG. 3 represents the results of a test of a simulated object scanned and then imaged according to the illustrative embodiments described above.

Object 300 is labeled as "ground truth", because this is the object to be reconstructed. That is, object 300 was a cube with a lower density core and higher density outer shell.

Object 300 was imaged using a simulated CT scanner, after which sinogram 302 was produced using the raw imaging data.

Next, the image of object 300 was reconstructed using multiple different image construction techniques from sinogram 302. Image 304 was constructed using the filtered back projection (FBP) technique. Note the presence of artifacts, such as artifact 306, as well as the fuzzy nature of the image. For additional information, the error in image 304 is shown in image 308. As can be seen, many errors exist.

Image 310 was constructed using the simultaneous algebraic reconstruction technique (SART). Again, note the presence of artifacts and the fuzzy nature of the image. Again, image 312 shows the error in the image. While the error is more distributed, as shown in image 312, the error is still considerable.

To improve this image, a technique for reducing artifacts was applied. The results of this technique are shown in image 314. As can be seen in image 316, the artifacts and errors are considerably reduced, but are still markedly present and easily seen.

In contrast, image 318 was reconstructed according to the illustrative embodiments described above. The resulting error is shown in image 320 and, in this particular example, the error was negligible. This result is seen in image 318, where there are few if any artifacts present.

Figure 4:
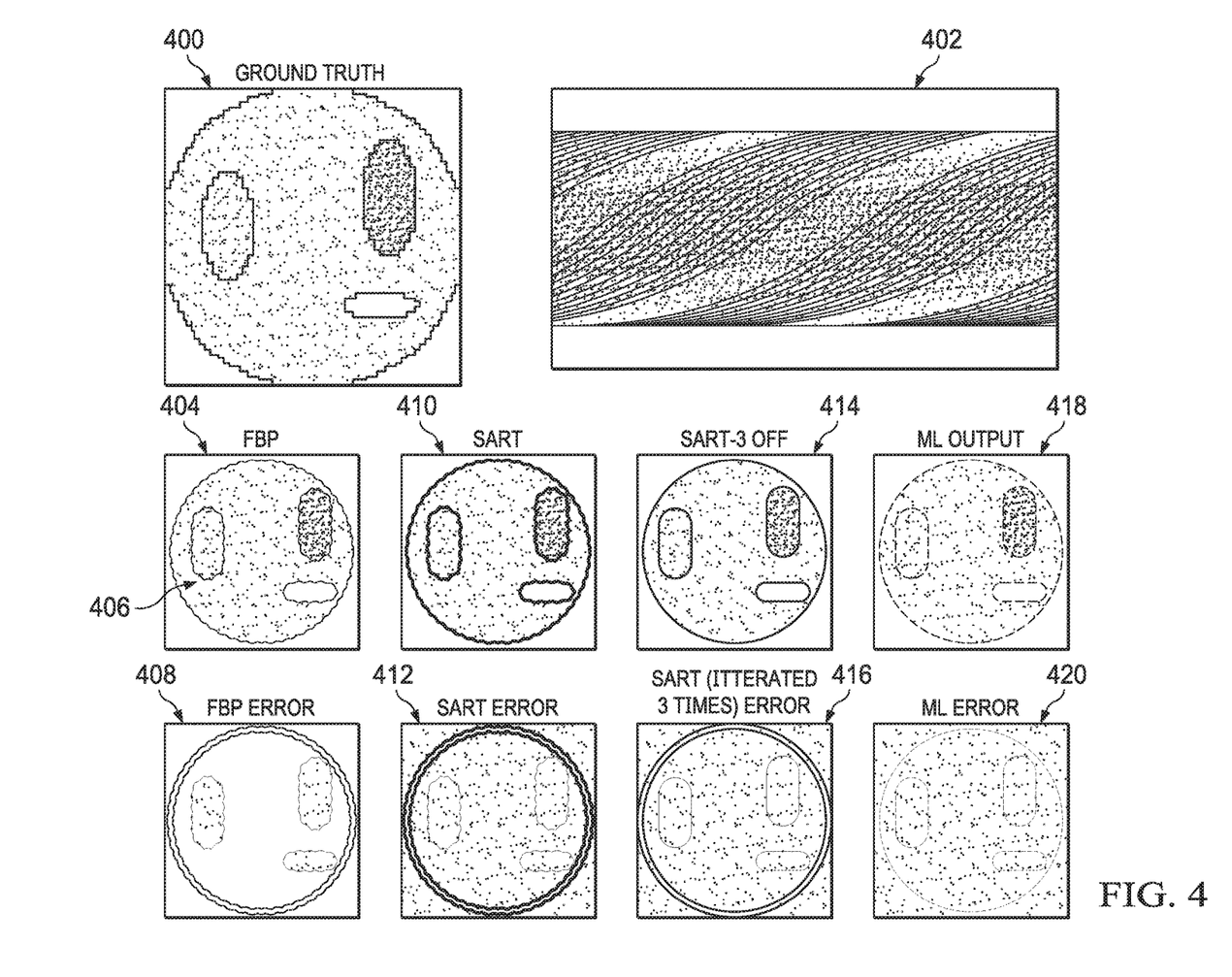
FIG. 4 illustrates an example comparing imaging data analyzed using prior techniques to imaging data analyzed using the data structure conversion described herein, in accordance with an illustrative embodiment.

FIG. 4 illustrates an example comparing imaging data analyzed using prior techniques to imaging data analyzed using the data structure conversion described herein, in accordance with an illustrative embodiment. FIG. 4 represents the results of a simulated test of an object scanned and then imaged according to the illustrative embodiments described above.

Object 400 is labeled as "ground truth", because this is the object to be reconstructed. That is, object 400 was a "medical phantom"—a common image found in the medical literature to simulate the cross-section of a torso. Object 400 was imaged using a simulated CT scanner, after which sinogram 402 was produced using the raw imaging data.

Next, the image of object 400 was reconstructed using multiple different image construction techniques from sinogram 402. Image 404 was constructed using the filtered back projection (FBP) technique. Note the presence of artifacts, such as artifact 406, as well as the fuzzy nature of the image. For additional information, the error in image 404 is shown in image 408. As can be seen, many errors exist.

Image 410 was constructed using the simultaneous algebraic reconstruction technique (SART). Again, note the presence of artifacts and the fuzzy nature of the image. Again, image 412 shows the error in the image. While the error is more distributed, as shown in image 412, the error is still considerable.

To improve this image, a technique for reducing artifacts was applied. The results of this technique are shown in image 414. As can be seen in image 416, the artifacts and errors are considerably reduced, but are still markedly present and easily seen.

In contrast, image 418 was reconstructed according to the illustrative embodiments described above. The resulting error is shown in image 420 and, in this particular example, the error was negligible. This result is seen in image 418, where there are few if any artifacts present.

Figure 5:
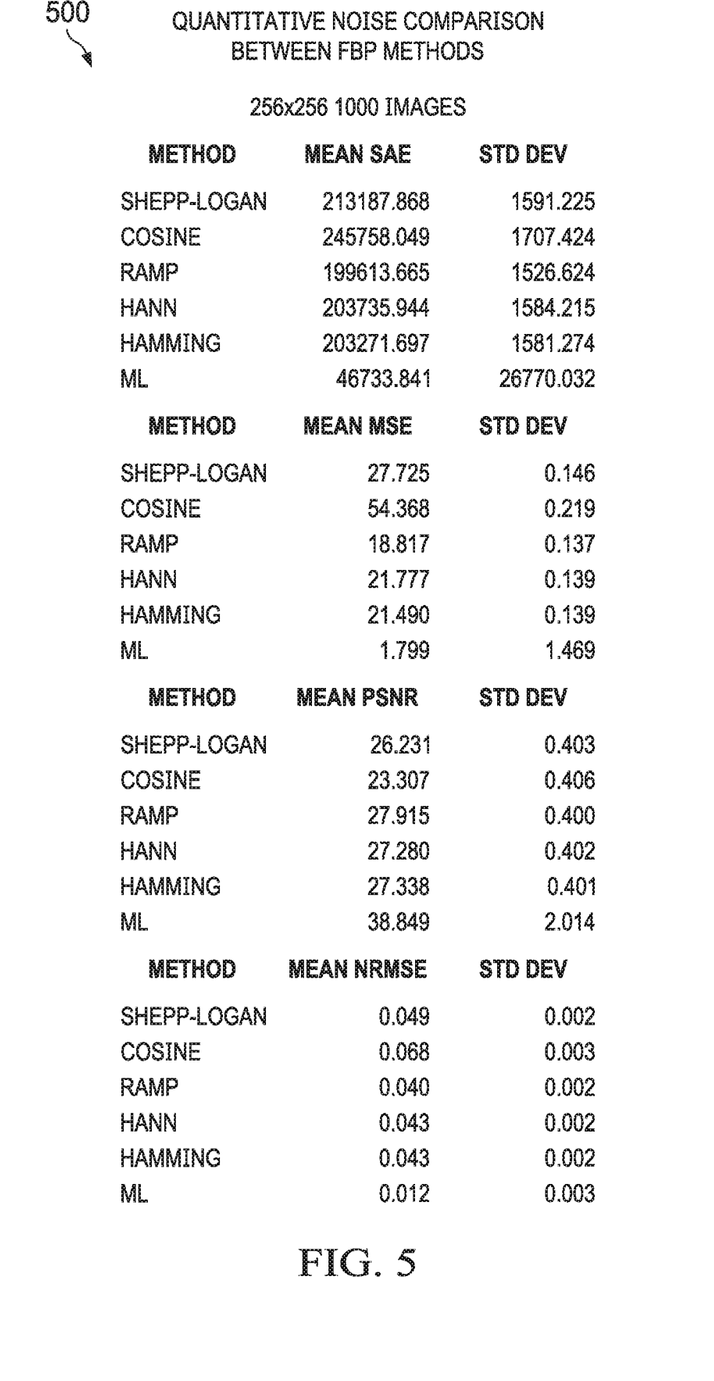
FIG. 5 illustrates a table of quantitative noise comparison between different techniques for processing imaging data, in accordance with an illustrative embodiment.

FIG. 5 illustrates a table of quantitative noise comparison between different techniques for processing imaging data, in accordance with an illustrative embodiment. Table 500 was generated from actual error analysis of simulated images reconstructed from imaging data of objects scanned with a simulated CT scanner.

In particular, table 500 shows the relative noise between several different filtered back projection (FBP) techniques, and the techniques of the illustrative embodiments labeled as "ML" (machine learning) in table 500. As can be seen, the mean SAE (sum absolute error) is quite large for all but the inventive method. The standard deviation was consistent for the older methods, but much higher for the inventive method.

As can be seen, the techniques of the illustrative embodiments represent an order of magnitude improvement in errors of the reconstructed image. Thus, the illustrative embodiments represent a quantitative leap in imaging technology in computers.

Note that while FIG. 3 through FIG. 5 have been described with respect to use of a CT scanner, the illustrative embodiments may be applied to other data structures using other types of imaging technologies. A useful feature of the illustrative embodiments is transforming either the raw data or processed data taken of a scanned image from the original data structure into a data structure for which a computer is better able to apply a machine learning technique, such as but not limited to a convolutional neural network, a locally connected neural network, a generative adversarial network, a capsule network, a graph neural network, a Bayesian neural network.

Figure 6:
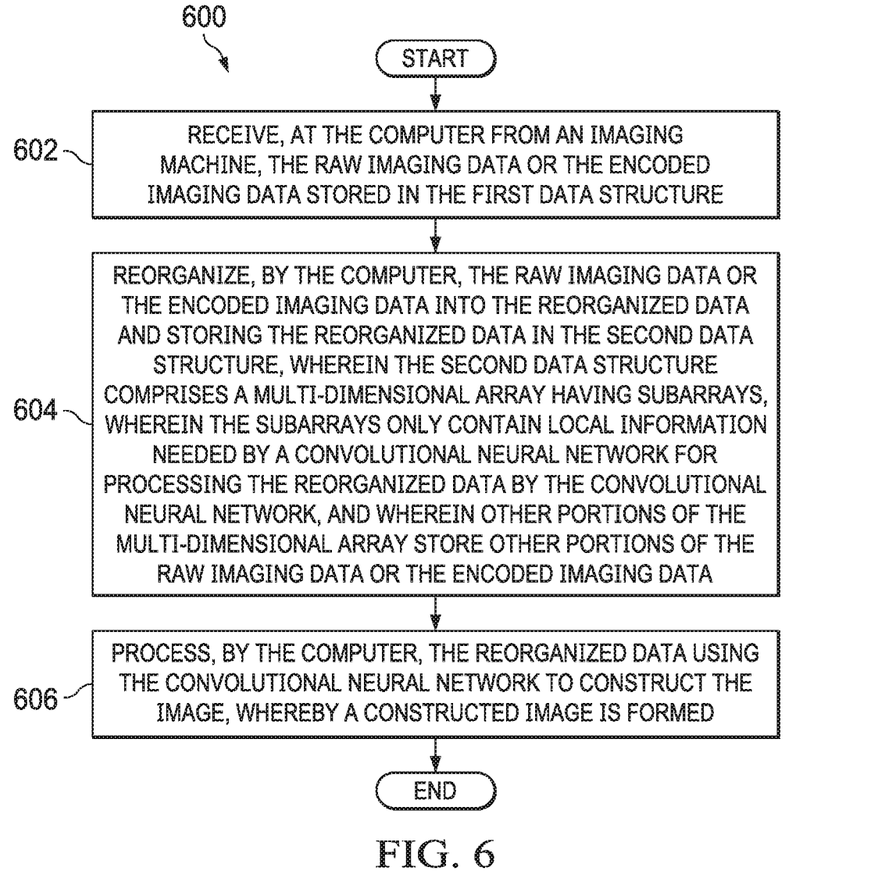
FIG. 6 illustrates a method of using a computer to construct an image from raw imaging data or encoded imaging data by transforming a first data structure in which the raw imaging data or the encoded imaging data is stored into a second data structure storing reorganized imaging data, in accordance with an illustrative embodiment.

FIG. 6 illustrates a method of using a computer to construct an image from raw imaging data or encoded imaging data by transforming a first data structure in which the raw imaging data or the encoded imaging data is stored into a second data structure storing reorganized imaging data, in accordance with an illustrative embodiment. Method 600 may be implemented using a computer, such as data processing system 700 of FIG. 7. Method 600 is inapplicable to humans, because method 600 relates to how computers process and transform data, and thus method 600 is a purely concrete, technical improvement.

Method 600 includes receiving, at the computer from an imaging machine, the raw imaging data or the encoded imaging data stored in the first data structure (operation 602). Method 600 also includes reorganizing, by the computer, the raw imaging data or the encoded imaging data into the reorganized data and storing the reorganized data in the second data structure, wherein the second data structure comprises a multi-dimensional array having subarrays, wherein the subarrays contain only local information needed by a convolutional neural network for processing the reorganized data by the convolutional neural network, and wherein other portions of the multi-dimensional array store other portions of the raw imaging data or the encoded imaging data (operation 604). Method 600 also includes processing, by the computer, the reorganized data using the convolutional neural network to construct the image, whereby a constructed image is formed (operation 606). In one illustrative embodiment, the method may terminate thereafter.

Method 600 may be varied. For example, method 600 may include displaying the constructed image on a display device. Method 600 may also include storing the constructed image on a non-transitory computer readable storage medium. Method 600 may also include performing, by the computer, at least one of displaying the constructed image on a display device and storing the constructed image on a non-transitory computer readable storage medium.

In still another illustrative embodiment, the raw imaging data or the encoded imaging data consists of the raw imaging data. In this case, the raw imaging data is from a computed tomography X-ray machine, and method 600 further includes encoding, by the computer, a sinogram in order to encode the raw imaging data via a direct mapping of shadow onto a line, whereby encoded data is formed prior to reorganizing; and wherein reorganizing is performed on the encoded data.

In another illustrative embodiment, reorganizing organizes the sinogram into the subarrays. In yet another illustrative embodiment, the imaging machine comprises one of a computed tomography X-ray machine, a positron emission tomography machine, an X-ray machine, an ultrasound machine, a computerized tomography scanner, a magnetic resonance imaging machine, a synthetic aperture radar machine, an acoustic tomography machine, and a cryogenic electron tomography machine.

In another example, the image comprises one of a two-dimensional image, a three-dimensional image, a solid volume, a function plot, and a numerical representation of data. In still another example, method 600 is performed on one of a graphical processor unit, a central processor unit, and neural hardware.

Still other variations are possible. Thus, the illustrative embodiments are not necessarily limited to these examples.

Figure 7:
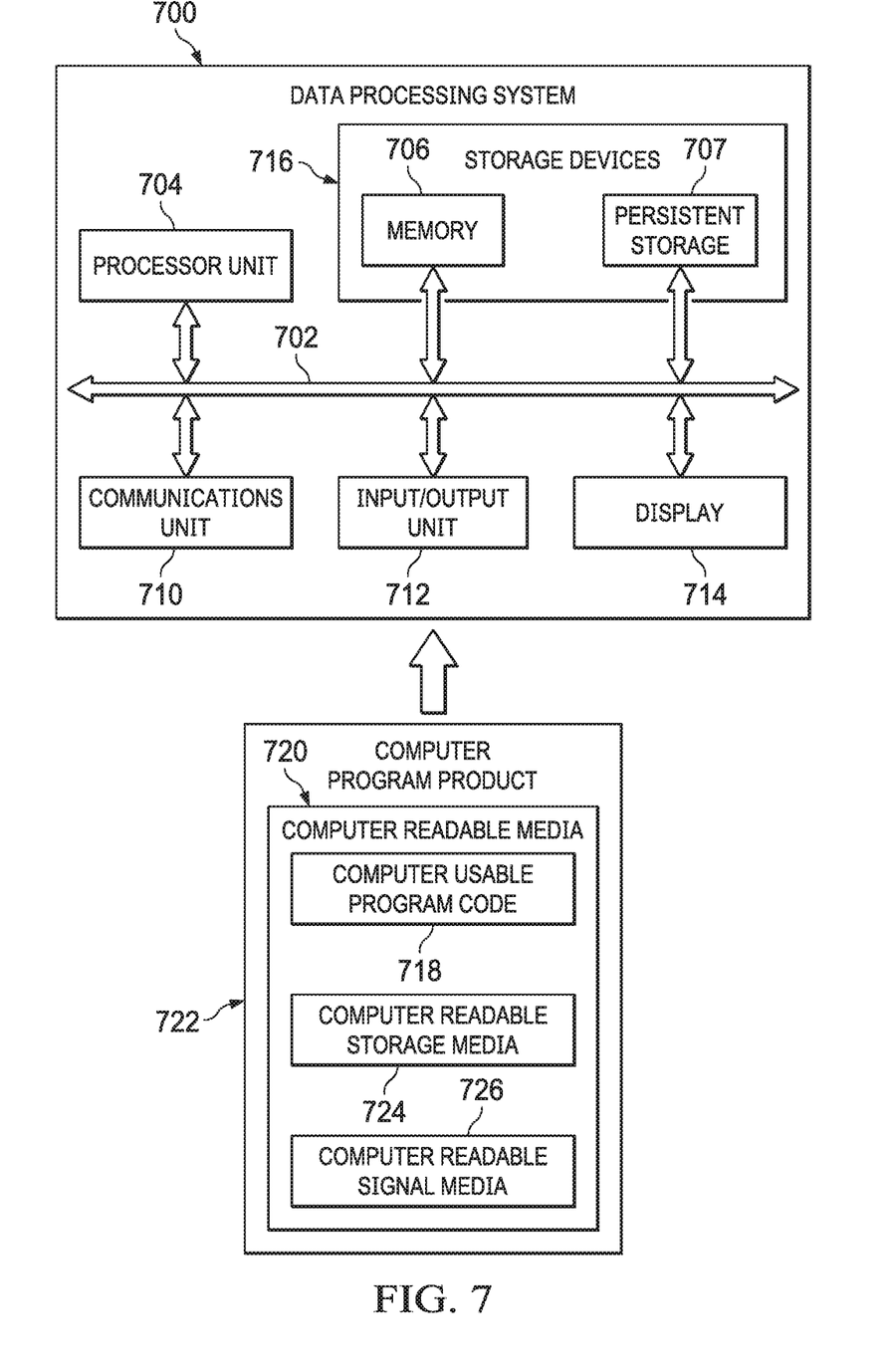
FIG. 7 illustrates a data processing system, in accordance with an illustrative embodiment.

Turning now to FIG. 7, an illustration of a data processing system is depicted in accordance with an illustrative embodiment. Data processing system 700 in FIG. 7 is an example of a data processing system that may be used to implement the illustrative embodiments, such those described with respect to FIG. 2 through FIG. 6. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. This software may be a content addressable memory, or software for implementing the processes described elsewhere herein. Thus, for example, software loaded into memory 706 may be software for executing the methods described with respect to FIG. 2 through FIG. 14. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of using a computer to construct an image from raw imaging data or encoded imaging data by transforming a first data structure in which the raw imaging data or the encoded imaging data is stored into a second data structure storing reorganized imaging data, the method comprising:
receiving, at the computer from an imaging machine, the raw imaging data or the encoded imaging data stored in the first data structure;
reorganizing, by the computer, the raw imaging data or the encoded imaging data into the reorganized data and storing the reorganized data in the second data structure, wherein the second data structure comprises a multi-dimensional array having subarrays, wherein the subarrays contain only local information needed by a convolutional neural network for processing the reorganized data by the convolutional neural network, and wherein other portions of the multi-dimensional array store other portions of the raw imaging data or the encoded imaging data;
processing, by the computer, the reorganized data using the convolutional neural network to construct the image, whereby a constructed image is formed.

2. The method of claim 1 further comprising:
displaying the constructed image on a display device.

3. The method of claim 1 further comprising:
storing the constructed image on a non-transitory computer readable storage medium.

4. The method of claim 1 further comprising:
performing, by the computer, at least one of displaying the constructed image on a display device and storing the constructed image on a non-transitory computer readable storage medium.

5. The method of claim 1 wherein the raw imaging data or the encoded imaging data consists of the raw imaging data, wherein the raw imaging data is from a computed tomography X-ray machine, and wherein the method further comprises:
encoding, by the computer, a sinogram in order to encode the raw imaging data via a direct mapping of shadow onto a line, whereby encoded data is formed prior to reorganizing; and
wherein reorganizing is performed on the encoded data.

6. The method of claim 5 wherein reorganizing organizes the sinogram into the subarrays.

7. The method of claim 1 wherein the imaging machine comprises one of a computed tomography X-ray machine, a positron emission tomography machine, an X-ray machine, an ultrasound machine, a computerized tomography scanner, a magnetic resonance imaging machine, a synthetic aperture radar machine, an acoustic tomography machine, and a cryogenic electron tomography machine.

8. The method of claim 1 wherein the image comprises one of a two-dimensional image, a three-dimensional image, a solid volume, a function plot, and a numerical representation of data.

9. The method of claim 1 wherein the method is performed on one of a graphical processor unit, a central processor unit, and neural hardware.

10. A computer comprising:
a processor; and
a non-transitory computer readable storage medium storing program code which, when executed by the processor, performs a computer-implemented method of using the computer to construct an image from raw imaging data or encoded imaging data by transforming a first data structure in which the raw imaging data or the encoded imaging data is stored into a second data structure storing reorganized imaging data, the program code comprising:
program code for receiving, at the computer from an imaging machine, the raw imaging data or the encoded imaging data stored in the first data structure;
program code for reorganizing, by the computer, the raw imaging data or the encoded imaging data into the reorganized data and storing the reorganized data in the second data structure, wherein the second data structure comprises a multi-dimensional array having subarrays, wherein the subarrays contain only local information needed by a convolutional neural network for processing the reorganized data by the convolutional neural network, and wherein other portions of the multi-dimensional array store other portions of the raw imaging data or the encoded imaging data;
program code for processing, by the computer, the reorganized data using the convolutional neural network to construct the image, whereby a constructed image is formed.

11. The computer of claim 10 wherein the program code further comprises:
program code for displaying the constructed image on a display device.

12. The computer of claim 10 wherein the program code further comprises:
program code for storing the constructed image on the non-transitory computer readable storage medium.

13. The computer of claim 10 wherein the program code further comprises:
program code for performing, by the computer, at least one of displaying the constructed image on a display device and storing the constructed image on a non-transitory computer readable storage medium.

14. The computer of claim 10 wherein the raw imaging data or the encoded imaging data consists of the raw imaging data, wherein the raw imaging data is from a computed tomography X-ray machine, and wherein the program code further comprises:
program code for encoding, by the computer, a sinogram in order to encode the raw imaging data via a direct mapping of shadow onto a line, whereby encoded data is formed prior to reorganizing; and
wherein the program code for reorganizing is executed using the encoded data.

15. The computer of claim 14 wherein the program code for reorganizing comprises program code for organizing the sinogram into the subarrays.

16. The computer of claim 10 wherein the imaging machine comprises one of a computed tomography X-ray machine, a positron emission tomography machine, an X-ray machine, an ultrasound machine, a computerized tomography scanner, a magnetic resonance imaging machine, a synthetic aperture radar machine, an acoustic tomography machine, and a cryogenic electron tomography machine.

17. The computer of claim 10 wherein the image comprises one of a two-dimensional image, a three-dimensional image, a solid volume, a function plot, and a numerical representation of data.

18. The computer of claim 10 wherein the computer comprises one of a graphical processor unit, a central processor unit, and neural hardware.

19. A non-transitory computer readable storage medium storing program code which, when executed by a processor, performs a computer-implemented method of using the computer to construct an image from raw imaging data or encoded imaging data by transforming a first data structure in which the raw imaging data or the encoded imaging data is stored into a second data structure storing reorganized imaging data, the program code comprising:
   program code for receiving, at the computer from an imaging machine, the raw imaging data or the encoded imaging data stored in the first data structure;
   program code for reorganizing, by the computer, the raw imaging data or the encoded imaging data into the reorganized data and storing the reorganized data in the second data structure, wherein the second data structure comprises a multi-dimensional array having subarrays, wherein the subarrays contain only local information needed by a convolutional neural network for processing the reorganized data by the convolutional neural network, and wherein other portions of the multi-dimensional array store other portions of the raw imaging data or the encoded imaging data;
   program code for processing, by the computer, the reorganized data using the convolutional neural network to construct the image, whereby a constructed image is formed.

20. The non-transitory computer readable storage medium of claim 19 wherein the raw imaging data or the encoded imaging data consists of the raw imaging data, wherein the raw imaging data is from a computed tomography X-ray machine, and wherein the program code further comprises:
   program code for encoding, by the computer, a sinogram in order to encode the raw imaging data via a direct mapping of shadow onto a line, whereby encoded data is formed prior to reorganizing; and
   wherein the program code for reorganizing is executed using the encoded data.

* * * * *